United States Patent [19]

Cotzas

[11] Patent Number: 4,477,767
[45] Date of Patent: Oct. 16, 1984

[54] STATIC EXCITATION SYSTEM

[75] Inventor: George M. Cotzas, Schenectady, N.Y.

[73] Assignee: General Electric Company, Schenectady, N.Y.

[21] Appl. No.: 211,766

[22] Filed: Dec. 1, 1980

[51] Int. Cl.³ .......................... H02P 9/30; H02P 11/00
[52] U.S. Cl. ...................................... 322/59; 310/198; 322/62
[58] Field of Search .......................... 322/59, 62, 251; 310/126, 198

[56] References Cited

U.S. PATENT DOCUMENTS 3,479,543  11/1969  Drexler ........................ 310/198 UX
3,702,965  11/1972  Drexler et al. .................... 322/59 X
4,268,788   5/1981  Takeda et al. ....................... 322/59

Primary Examiner—R. J. Hickey
Attorney, Agent, or Firm—John F. Ahern; Paul Checkovich

[57] ABSTRACT

A simplified static excitation system for a fluid-cooled dynamoelectric machine comprises a potential source excitation winding disposed in the stator slots, the winding being responsive to the fundamental frequency of the generator air-gap magnetic flux. The excitation system further comprises transformer means coupling the excitation winding to rectification means which is coupled to the rotating field windings so as to provide direct electric current thereto. The transformer means is preferably disposed within the cooling fluid of the machine.

9 Claims, 2 Drawing Figures

STATIC EXCITATION SYSTEM

BACKGROUND OF THE INVENTION

The present invention relates to excitation systems for large fluid-cooled dynamoelectric machines and in particular to static excitation systems.

Excitation systems for large dynamoelectric machines, such as the turbine-generator combinations employed by electric utilities, have grown in power rating along with the power ratings of the generators themselves. Early excitation systems included rotating power sources such as a separate dc generator driven by the turbine-generator shaft which supplies excitation current to the rotating field windings through slip rings and brushes. Another approach has employed an ac exciter driven by the turbine-generator with rectification and control of the excitation voltage in external stationary rectifier banks. Still another approach has employed the use of diode rectifiers on the rotor. In these arrangements, the whole rectification power source rotates, with control effected through electromagnetic flux linkages with the rotating components. An example of an excitation system having rotating rectification means is found in U.S. Pat. No. 3,768,502 issued Oct. 23, 1973 to Drexler et al.

A separate category of excitation systems is referred to as "static" because the excitation power source does not rotate, but is stationary or static. A compound excitation system of the static type is described, for example, in U.S. Pat. No. 3,702,965 issued Nov. 14, 1972 to Drexler et al. The patent to Drexler et al. describes an excitation system receiving energy from both potential windings and current windings. Hence, the term compound source is applied. The current windings provide electrical energy to the excitation system in response to the output current from the generator armature winding, that is, from the main machine output winding. The potential windings supply electrical energy to the excitation system in response to the voltage across the armature windings. Such compound source excitation systems exhibit response ratios of approximately 3.5 or better. The potential windings for such machines are typically found within the stator slots, lying over, but insulated from, the main armature winding. On the other hand, the current windings for the excitation system generally surround each phase of the three typical phases of the armature output winding leads.

However, simpler excitation systems are possible, particularly where a high response ratio is not required. A simple excitation system, for example, appears to be disclosed in U.S. Pat. No. 3,132,296 issued May 5, 1964 to Nippes. However, the excitation system in this patent is solely directed toward utilizing the third and higher harmonics of the fundamental frequency of the rotor magnetic flux. Such systems as disclosed therein are not practical for large dynamoelectric machines. (As used herein, the term large dynamoelectric machine refers to one which has a power rating in excess of approximately 50 megawatts.) The third harmonic or other higher harmonic is not capable of providing sufficient power to the excitation system to produce such high levels of generator output. Unlike the cooling requirements of large machines, the cooling requirements for the excitation system components of a machine employing only third or higher harmonics of the rotor magnetic flux, are minimal. However, certain excitation system components of large machines require cooling to operate effectively and reliably over extended periods of time.

SUMMARY OF THE INVENTION

In accordance with a preferred embodiment of the present invention a static excitation system for a large, fluid-cooled dynamoelectric machine having a rotating field winding and a stator core with a set of main windings disposed in slots in said stator core comprises an excitation winding disposed in the same stator slots so that alternating current is induced therein by the action of the rotating field winding, the excitation winding being connected so as to be responsive to the first harmonic frequency of the rotor magnetic flux. The excitation system further comprises a transformer means coupling the excitation winding to a rectification means which provides direct current to the rotating field winding, the transformer means preferably being disposed within the cooling fluid path of the machine.

The excitation system of the present invention is simple and reliable. Additionally, the excitation system of the present invention does not require current windings and accordingly is less expensive than compound source excitation systems.

Accordingly, it is an object of the present invention to provide a simple, inexpensive and reliable excitation system for a large dynamoelectric machine.

It is a further object of the present invention to provide an excitation system having a high initial response.

DETAILED DESCRIPTION OF THE INVENTION

Figure 1:
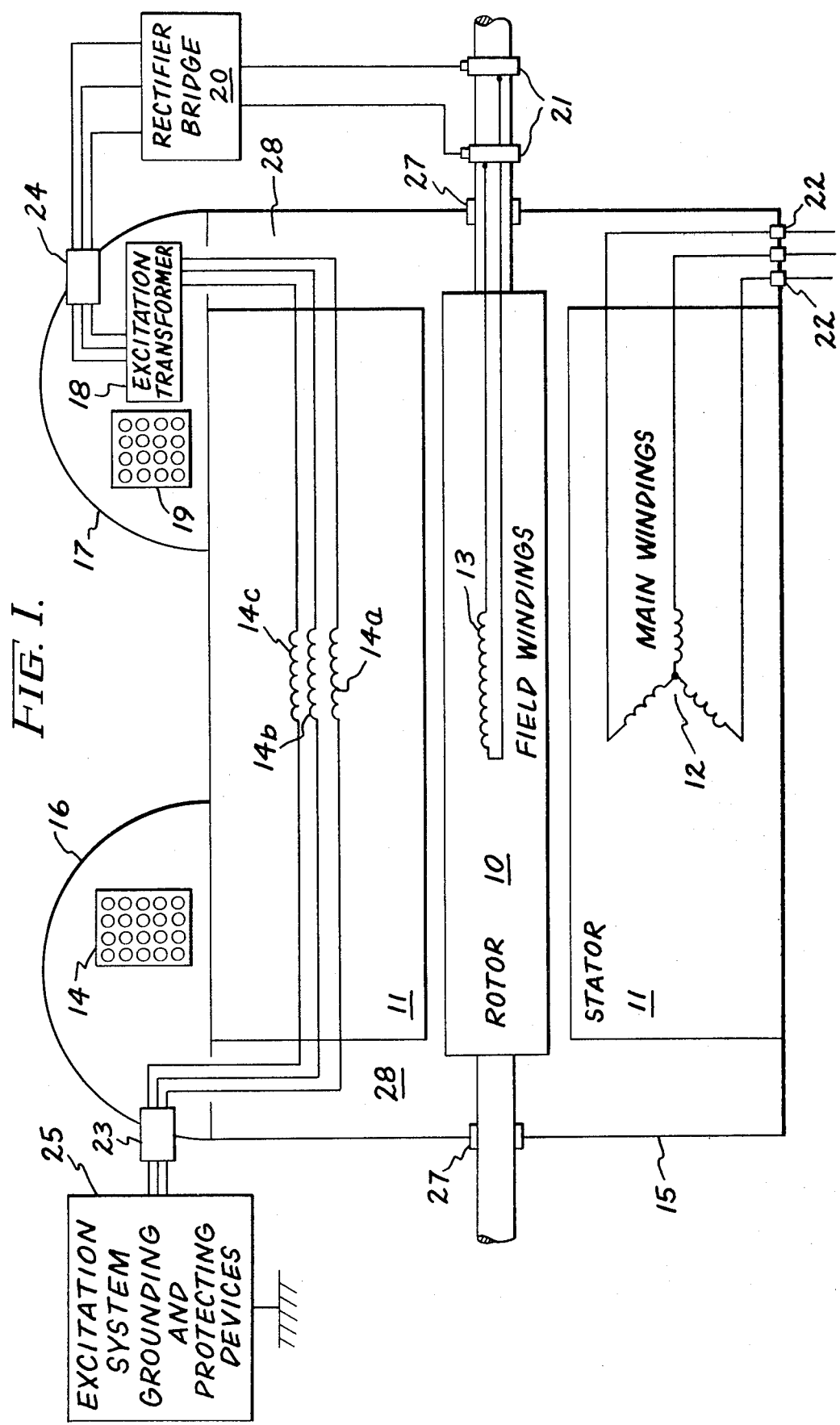
FIG. 1 is a schematic, partially electrical and partially mechanical, drawing illustrating the excitation system of the present invention.

FIG. 1 illustrates the excitation system of the present invention employed in a large dynamoelectric generator such as that which would be employed by an electric utility to provide power. The generator comprises an outer, pressurizable shell or enclosure 15 throughout which a cooling fluid, such as hydrogen gas, is circulated to cool the machine. Within pressurizable shell 15 there is disposed a stator 11 of conventional construction such as that disclosed in the above-mentioned U.S. Pat. No. 3,702,965, which is hereby incorporated herein by reference. The stator construction typically comprises a large plurality of sectorially shaped metal punchings stacked so as to form a hollow cylindrical structure, the inner periphery of which possesses a plurality of longitudinal slots in which main windings 12 are disposed. It is from main windings 12 that the output electrical power of the generator is provided through high-voltage bushings 22. Disposed within the hollow cylindrical portion of the stator assembly 11, there is disposed rotor 10 which is typically coupled to a steam turbine or other motive source. To maintain cooling fluid 28 within the generator, seals 27 are provided. Rotor 10 comprises a large cylindrical metal forging into which longitudinal slots have been cut. Within these slots there is typically provided two or more field windings 13. It is these field windings 13 which are energized through the excitation system of the present invention. Field windings 13 produce a radially directed field of magnetic flux which cuts across the main windings 12 during rotation, thereby producing the desired electrical power output.

Because of the large amounts of electrical power generated by such dynamoelectric machines as illustrated in FIG. 1, even the slightest inefficiencies in machine operation can be very costly and can produce large amounts of thermal energy within the machine which must be removed for the long-term reliable operation demanded by the intended use. It is for such reasons that the main windings 12 are typically cooled with a liquid coolant such as water. This is relatively easily arranged because of the stationary nature of the main windings. However, it is also necessary to cool rotor 10. This is typically accomplished by circulating therethrough a cooling fluid 28, such as hydrogen gas, which is preferred because it not only exhibits the capability of absorbing and transporting large amounts of thermal energy, but also because its density reduces windage losses in the machine. By means of rotor-mounted fans (not shown) and other conventional fluid circulating means, the coolant fluid 28 is circulated past coolers 19 disposed in domes 16 and 17 atop the generator. It is these coolers 19 which remove heat from the cooling fluid before it is cycled back to the interior of the main generator housing and in particular before it is recirculated back to the gap between the rotor 10 and the stator 11.

Next is considered the excitation system itself and its relation to the other components of the generator. The essential feature of the excitation system of the present invention is the winding set 14a, 14b and 14c shown in FIG. 1. The windings may comprise one or more conductive bars disposed in the stator slots. These windings are the potential source windings of the excitation system and are more generally referred to as "P-bars". These windings are placed in the stator slots along with main winding 12. However, the P-bar windings are required to carry substantially less current than the main stator windings themselves. Typically, the P-bar windings carry currents of less than approximately 2,000 amperes. These P-bar windings (generally designated by reference number 14) are placed in the slots in a manner such as that shown in the above-mentioned U.S. Pat. No. 3,702,965. Typically they constitute single bars of copper located at 120° intervals about the inner circumference of the generator stator. Preferably, one of these three P-bars is located at the topmost slot in a horizontal generator stator. This leaves the bottom 120° of the stator assembly open and more amenable to the insertion of the rotor forging during generator assembly. At one end, all of the P-bar windings are referenced to a neutral ground so as to be arranged in an electrical wye configuration. This function is preferably performed by leading the P-bar winding connections out from dome 16 through bushing 23 to circuit 25. Circuit 25 performs conventional fusing and circuit breaker functions for the potential windings 14, both individually and collectively. At the other end of the generator, the collector end, the P-bar windings 14 are coupled directly to excitation transformer 18. This transformer is discussed in more detail below. The output leads of the transformer leave the pressurized generator housing from dome 17 through bushing 24 so as to couple the excitation transformer with rectifier bridge 20. The rectifier bridge provides directcurrent output to fixed brushes and thence to slip rings 21 which rotate with the rotor 10. The brushes conventionally comprise carbon. Thus, electrical energy induced in the P-bar windings in alternating-current form is provided as an input to excitation transformer 18 after which it is rectified and supplied to the field winding as a source for the rotating magnetic flux. As is of course known, since residual magnetism in the rotor 10 is generally not sufficient for the purposes of generator startup, other electrical circuits (not shown) are generally present to provide electrical current to the slip rings 21 during initial generator startup. Following this, however, the generator is self-exciting.

Figure 2:
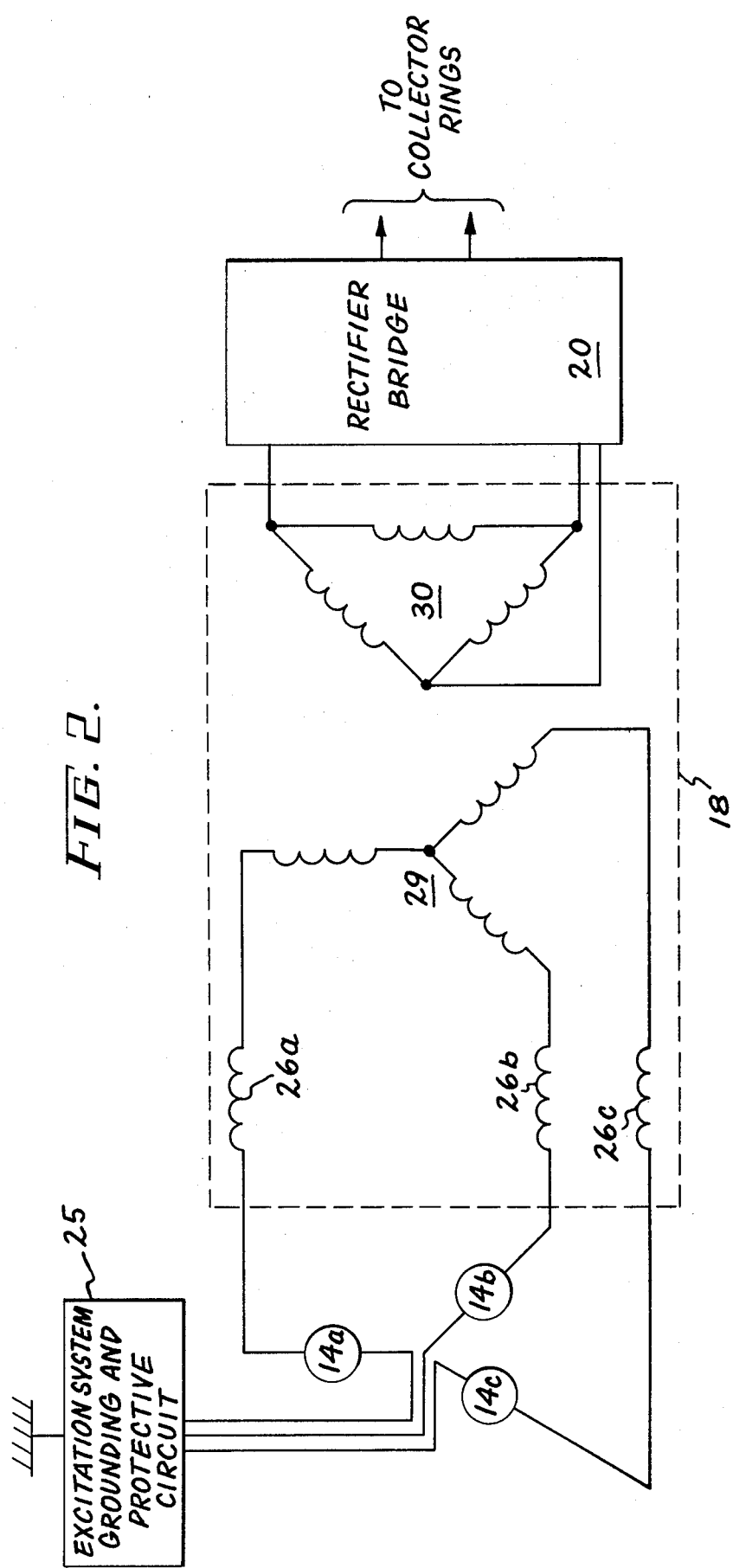
FIG. 2 is a schematic diagram particularly illustrating the excitation transformer.

FIG. 2 more particularly illustrates the detailed construction of the excitation transformer 18. In particular, the primary of the transformer 29 is preferably configured in a wye circuit and the secondary of the excitation transformer is configured in a delta circuit. One of the significant economies brought about by the excitation system of the present invention is the elimination of the need for certain large linear reactive circuits. Because the excitation system voltages are no longer directly dependent upon the output current, these current-limiting reactances in the P-bar circuit are no longer required. Instead, suitable reactance may be provided by leakage flux within the excitation transformer itself. This leakage reactance is indicated by inductors 26a, 26b and 26c shown within the dotted line of FIG. 2. Accordingly, that which is inside the dotted line is a simplified equivalent circuit and the inductors 26a, 26b and 26c are not required to be separately provided.

As indicated above, it is desirable that P-bar windings 14 not be required to carry large amounts of current, that is to say, currents in excess of approximately 2,000 amperes. This is highly desirable because separate cooling facilities for the P-bars need not be required. Since low current through the P-bar is desirable in large dynamoelectric machines, transformer 18 is required so that the excitation system be capable of supplying a sufficient amount of electrical power to the field winding 13. However, a significant advantage of the present transformer, as compared with those that we have been employed in compound excitation systems, is that now the large current winding through the transformer is no longer required, thereby significantly reducing the cost and complexity of its construction, not to mention its size. It is this size reduction which facilitates placement of the transformer within the domes for the cooling system presently provided on large generators.

Another alternative to generator system design in which there is a low level of current in the P-bars involves increasing the number of P-bars per generator phase. This does not present significant design problems since adequate space in the stator slots is usually available in machines with high power ratings.

A significant advantage of the present invention arises because a smaller excitation transformer 18 is now needed because of the lack of need for the current winding. This aids placing excitation transformer 18 in cooling dome 17, directly in the path of flow for the generator coolant 28. This further simplifies design of this transformer.

The rectifier bridge is a conventional three-phase, full-wave rectifier bridge with thyristors, as needed, for voltage control. Also, the transformer may also comprise a set of three two-phase transformers rather than the single three-phase transformer as shown. In one desirable embodiment there is a relatively weak magnetic link between the primary and the secondary so as to provide sufficient leakage reactance to limit the current under fault conditions in the output of the excitation system.

From the above it may be appreciated that the simplified excitation system for large dynamoelectric machines as provided by the present invention offers significant advantages not to be found in other excitation systems. The system of the present invention is simpler and therefore more reliable. It eliminates the need for separately provided current limiting reactances in the excitation system circuitry. These reactances are large, relatively expensive and must generally be separately cooled. Furthermore, the excitation system described herein requires a much simpler transformer having only primary and secondary windings without the need of providing separate current windings, which are necessarily difficult, cumbersome and expensive to provide since use of the highly energized main winding output conductors is involved. Nonetheless, the system provides a high initial response and permits direct cooling of the required excitation transformer.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A static excitation system for a dynamoelectric machine having a rotating field winding producing a rotating magnetic field and having a stator core with a multiphase set of main armature windings disposed in slots therein, said excitation system comprising:
    a set of multiphase excitation windings in the form of at least one electrically conductive bar disposed in at least one slot in said stator core corresponding to said multiphase set of main windings and disposed correspondingly in said slots so that there is one excitation winding for each main winding;
    an internal multiphase excitation transformer consisting essentially of multiphase primary and secondary windings in correspondence with said multiphase excitation windings, each primary winding being electrically connected to a corresponding excitation winding, said primary and said secondary windings of said excitation transformer being inductively loosely coupled providing leakage reactance for limiting rapid transient current flow from said electrically conductive bars of said excitation winding; and
    rectifier means electrically connected to receive electrical power from said secondary windings in proportion to voltage induced in said excitation windings by said rotating magnetic field and to provide direct current excitation for said rotating field winding.

2. The excitation system of claim 1 wherein said multiphase excitation windings comprise three windings connected in an electrical wye configuration.

3. The excitation system of claim 2 wherein the primary windings of said excitation transformer comprise three windings connected in an electrical wye configuration and the secondary windings of said excitation transformer comprise three windings connected in an electrical delta configuration.

4. The excitation system of claim 3 wherein the number of conductive bars per main winding is selected to be greater than one for limiting the electrical current flow from said bars.

5. The excitation system of claim 4 wherein each electrically conductive bar is circumferentially separated from the other about the inner circumference of the stator by about 120°.

6. A static excitation system for an electrical power generator having a set of three-phase stator armature windings disposed in slots of a stator core about a central rotating field winding producing a rotating magnetic field, the excitation system comprising:
    a three-phase set of excitation windings in the form of at least one electrically conductive bar per phase disposed in said slots so that there is one excitation winding for each armature winding;
    an internal three-phase excitation transformer having primary and secondary windings, said primary windings being connected to said excitation windings and responsive to voltages induced therein by said rotating magnetic field to provide three-phase electric power from said secondary windings, said excitation transformer when excited by voltage generated in said excitation windings providing three-phase excitation power substantially independent of electric current flow in said armature windings; and
    a three-phase rectifier for receiving said electrical power from the secondary winding of said transformer and providing direct current excitation to said field winding, wherein said excitation transformer includes leakage reactance between windings sufficient to limit transient current from said set of excitation windings.

7. An excitation system according to claim 6 wherein each excitation winding comprises at least one electrically conductive bar.

8. An excitation system according to claim 7 wherein said three-phase set of excitation windings are connected together in an electrical wye configuration.

9. An excitation system according to claim 8 wherein the primary windings of said excitation transformer are connected together in an electrical wye configuration and the secondary windings thereof are connected together in an electrical delta configuration.

* * * * *